(12) United States Patent
Benkreira et al.

(10) Patent No.: US 11,328,266 B2
(45) Date of Patent: May 10, 2022

(54) SYSTEMS AND METHODS FOR NOTIFYING AN ENTITY OF A REQUESTED PAYMENT

(71) Applicant: Capital One Services, LLC, McLean, VA (US)

(72) Inventors: Abdelkader M'Hamed Benkreira, Washington, DC (US); Michael Mossoba, Arlington, VA (US); Adam Vukich, Alexandria, VA (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/258,131

(22) Filed: Jan. 25, 2019

(65) Prior Publication Data

US 2020/0242570 A1    Jul. 30, 2020

(51) Int. Cl.
| | |
|---|---|
| *G06Q 20/04* | (2012.01) |
| *H04L 12/58* | (2006.01) |
| *G06Q 20/02* | (2012.01) |
| *G06F 40/56* | (2020.01) |
| *H04L 51/046* | (2022.01) |

(52) U.S. Cl.
CPC .......... *G06Q 20/042* (2013.01); *G06F 40/56* (2020.01); *G06Q 20/023* (2013.01); *H04L 51/046* (2013.01)

(58) Field of Classification Search
CPC .. G06Q 20/042; G06Q 20/023; G06Q 20/047; G06Q 20/102; G06Q 20/14; G06F 40/56; H04L 51/046; H04L 51/24
See application file for complete search history.

(56) References Cited

U.S. PATENT DOCUMENTS

| | | | |
|---|---|---|---|
| 5,903,878 A | 5/1999 | Talati et al. | |
| 6,574,377 B1 * | 6/2003 | Cahill | G06Q 40/12 382/305 |
| 6,676,310 B2 | 1/2004 | Simpson et al. | |
| 6,865,560 B1 * | 3/2005 | Sansone | G07B 17/00024 700/115 |
| 7,103,579 B1 | 9/2006 | Phillips et al. | |
| 8,494,956 B2 * | 7/2013 | Tulluri | G06Q 20/10 705/39 |
| 8,751,379 B1 | 6/2014 | Bueche, Jr. | |
| 8,762,267 B2 | 6/2014 | Paintin et al. | |
| 9,609,973 B1 * | 4/2017 | Pleasant | H04L 51/24 |
| 9,990,613 B1 * | 6/2018 | Bhatt | G06Q 20/102 |
| 2001/0039534 A1 * | 11/2001 | Keene | G06Q 40/00 705/45 |

(Continued)

OTHER PUBLICATIONS

Web Pay—Payments Flowcharts and Wireframes (Apr. 18, 2016) (Year: 2016).*

*Primary Examiner* — Mike Anderson
*Assistant Examiner* — James H Miller
(74) *Attorney, Agent, or Firm* — DLA Piper LLP (US)

(57) ABSTRACT

Embodiments of the present disclosure relate to systems and methods for notifying an entity of a requested payment. In addition, embodiments of the present disclosure relate to solutions for identifying information about an intended recipient of a payment. Embodiments of the present disclosure also relate to solutions for sending a notification to a recipient regarding a payment. Embodiments of the present disclosure further relate to solutions for allowing a recipient to track a payment.

20 Claims, 11 Drawing Sheets

(56) References Cited

U.S. PATENT DOCUMENTS

| | | | | |
|---|---|---|---|---|
| 2002/0082962 | A1* | 6/2002 | Farris | G06Q 30/06 705/35 |
| 2004/0249652 | A1* | 12/2004 | Aldstadt | G06Q 10/087 705/28 |
| 2005/0121517 | A1* | 6/2005 | Igval | G07B 17/00362 235/385 |
| 2005/0160038 | A1* | 7/2005 | Albornoz | G06Q 20/10 705/42 |
| 2005/0197974 | A1* | 9/2005 | Schenck | G06Q 10/08 705/401 |
| 2008/0010204 | A1* | 1/2008 | Rackley, III | G06Q 20/042 705/45 |
| 2009/0003271 | A1* | 12/2009 | Bulawa | G06Q 20/102 705/34 |
| 2009/0307119 | A1 | 12/2009 | Ahles et al. | |
| 2009/0327111 | A1* | 12/2009 | Bulawa | G06Q 20/102 705/34 |
| 2010/0042538 | A1 | 2/2010 | Dheer et al. | |
| 2012/0323768 | A1* | 12/2012 | Weinstein | G06Q 40/02 705/39 |
| 2013/0290178 | A1* | 10/2013 | Masie | G06Q 20/40 705/40 |
| 2014/0052621 | A1 | 2/2014 | Love | |
| 2014/0156785 | A1* | 6/2014 | Kammula | H04L 67/306 709/217 |
| 2014/0372266 | A1* | 12/2014 | Tatham | G06Q 20/042 705/33 |
| 2015/0310404 | A1 | 10/2015 | Dorsey et al. | |
| 2018/0240081 | A1* | 8/2018 | Doyle | G06Q 20/108 |
| 2018/0336543 | A1* | 11/2018 | Van Os | G06Q 20/223 |
| 2019/0010204 | A1* | 1/2019 | Chen | C07K 14/605 |
| 2019/0339822 | A1* | 11/2019 | Devine | G06F 3/0484 |
| 2020/0020002 | A1* | 1/2020 | Ceribelli | G06Q 30/04 |

\* cited by examiner

Name of Entity

| Bank account | Bank name = ABC Bank<br>Routing number = 123456789<br>Account number = 9123456789 |
|---|---|
| Electronic address | Telephone number = 123-4567<br>E-mail address = 123@example.com |
| Mailing address | 12 Abc Road<br>Example, VA 12345 |
| Preferences | Notifications = Yes<br>Notification frequency = daily<br>Electronic address = telephone<br>Receive payment by = mail check |

Issue a Check

Recipient name:

Recipient mailing address:

Amount:

Issue Date:

Recipient email address:

Recipient phone number:

Memo line:

FIG. 10

Check Status

| Issue Date | Sender | Amount | Status |
|---|---|---|---|
| April 21, 2018 | Max Samuelson | $75.42 | Mailed. Expected delivery in three days. |
| March 30, 2018 | Alex Thompson | $25.62 | Received |
| March 16, 2018 | John Smith | $50.00 | Received |

SYSTEMS AND METHODS FOR NOTIFYING AN ENTITY OF A REQUESTED PAYMENT

BACKGROUND

For thousands of years, entities, such as people or legal entities, have been exchanging money for goods or services. One of the most common ways of transferring money from one entity to another is through use of a check. A check is a document that orders a bank to pay a specific amount of money from one entity's account to the entity in whose name the check has been issued. The entity writing the check, often called the drawer, holds an account at a bank from which they can withdraw money using checks. The drawer fills out certain information when writing a check, such as the monetary amount, date, and name of the payee.

As more and more people are starting to access content over networks using electronic devices, banks are beginning to offer services to their customers to allow their customers to pay bills online. Banks offer services such as an online bill pay center, where a customer can enter the information they would typically include on a check on a website, and the bank then automatically issues a check with that information and mails it to the payee. While these bill pay systems make writing a check easier for the drawer, little has changed for the recipient. The recipient typically receives the check in the mail several days later, often with no prior notice that a check had been issued.

SUMMARY

Embodiments of the present disclosure relate to systems and methods for notifying an entity of a requested payment. In addition, embodiments of the present disclosure relate to solutions for identifying information about an intended recipient of a payment. Embodiments of the present disclosure also relate to solutions for sending a notification to a recipient regarding a payment. Embodiments of the present disclosure further relate to solutions for allowing a recipient to track a payment.

In accordance with some embodiments of the present disclosure, there is provided a computer-implemented method for notifying an entity of a requested payment. The method comprises receiving, by a computer system including a processor, information representing a request to send payment from a first entity to a second entity, the information indicating an amount of the payment and an identify of the second entity. The method also comprises identifying, by the computer system, a mailing address associated with the second entity and an address for electronically contacting the second entity, and generating, by the computer system, a notification identifying the requested payment, the notification including a sentence that was not included in the received information and that conveys at least a portion of the received information. The method further comprises causing, by the computer system, the notification to be electronically transmitted over a network to a computing device associated with the second entity based on the address for electronically contacting the second entity. The method still further comprises causing, by the computer system, a check to be issued for the payment and mailed to the second entity after the notification has been electronically transmitted.

In accordance with aspects of the disclosure, the computer system causes the check to be issued and mailed to the mailing address associated with the second entity when the second entity does not respond to the notification within a pre-determined period of time.

In accordance with further aspects of the disclosure, the notification includes an inquiry as to the mailing address associated with the second entity, and the method further comprises receiving, by the computer system, a response to the notification indicating that a different mailing address is associated with the second entity. The method still further comprises causing, by the computer system, the check to be mailed to the new mailing address.

In accordance with still further aspects of the disclosure, the method further comprises generating the sentence based on a template stored in the computer system.

In accordance with aspects of the disclosure, the method further comprises generating the sentence using natural language processing (NLP).

In accordance with further aspects of the disclosure, the mailing address associated with the second entity is a first mailing address, and the method further comprises receiving, by the computer system, information indicating a second mailing address associated with the second entity in response to a user inputting the second mailing address into a screen of a user interface. The method further comprises retrieving, by the computer system, a record associated with the second entity from a database, and identifying, by the computer system, the first mailing address from the record. The method still further comprises causing, by the computer system, a computing device associated with the first entity to prompt the user with an indication of the first mailing address. The method also comprises causing, by the computer system, the check to be mailed to the first mailing address associated with the second entity in response to the user confirming the first mailing address as correct.

Furthermore, in accordance with some embodiments, there is provided a computer system for notifying an entity of a requested payment, comprising a memory storing instructions and a processor that is configured to execute the instructions. The processor, when executing the instructions, is configured to receive information representing a request to send payment from a first entity to a second entity, the information indicating an amount of the payment and an identity of the second entity. The processor, when executing the instructions, is further configured to cause a check to be issued for the amount of the payment, and cause the check to be mailed to a mailing address associated with the second entity. The processor, when executing the instructions, is still further configured to cause a notification to be transmitted over a network to a computing device associated with the second entity indicating that the check has been mailed.

In accordance with aspects of the disclosure, the notification includes a link selectable on the computing device. The processor is further configured to receive an indication that a user has selected the link and to cause the computing device to generate a screen in response to user selection of the link, the screen presenting additional information about the payment.

In accordance with further aspects of the disclosure, the notification includes a link selectable on the computing device. The processor is further configured to receive an indication that a user has selected the link, and to cause the computing device to generate a screen in response to the selection of the link indicating that the link has expired.

In accordance with still further aspects of the disclosure, the notification includes a link selectable on the computing device. The processor is further configured to receive an indication that the user has selected the link, and to cause the computing device to generate a screen in response to selection of the link, the screen providing fields that allow the second entity to register with an online transaction system.

In accordance with aspects of the disclosure, registration with the online transaction system allows the second entity to check status of issued checks.

In accordance with further aspects of the disclosure, registration with the online transaction system allows the second entity to store one or more preferences regarding at least one of a mailing address, an electronic address, or whether to receive notifications.

In accordance with still further aspects of the disclosure, the processor is further configured to receive the information representing the request to send payment in response to a user populating one or more fields of a user interface presented on a computing device associated with the first entity.

In accordance with aspects of the disclosure, the processor is further configured to automatically generate an alphanumeric string from the information representing the request to send payment from the first entity to the second entity. The processor is still further configured to generate a notification including the alphanumeric string, and to cause the alphanumeric string of the notification to be displayed by transmitting the notification over the network to the computing device associated with the second entity.

In accordance with further aspects of the disclosure, the alphanumeric string includes alphanumeric characters identifying the first entity, the second entity, and an amount of the payment.

In accordance with still further aspects of the disclosure, the notification is a first notification, and the processor is further configured to transmit a second notification to the computing device associated with the second entity, the second notification indicating that the check is going to expire.

Further still, in accordance with some embodiments, there is provided a non-transitory computer-readable medium storing instructions that, when executed by one or more processors, cause the one or more processors to perform a method. The method comprises receiving information representing a request to send payment from a first entity to a second entity, the information indicating an amount of the payment and an identity of the second entity. The method further comprises identifying a record associated with the second entity, and determining whether to send a notification identifying the payment to a computing device associated with the second entity based on information stored within the record.

In accordance with aspects of the disclosure, the method further comprises determining that the record indicates a preference associated with the second entity to not receive notifications. The method still further comprises determining not to send the notification based on the preference, and causing a check to be issued for the payment and mailed to a mailing address associated with the second entity.

In accordance with further aspects of the disclosure, the method further comprises causing the notification to be electronically sent over a network to a computing device associated with the second entity, the notification being configured to display a prompt providing a user of the computing device with an option to receive the payment via an automated clearing house (ACH) network.

In accordance with still further aspects of the disclosure, the method further comprises receiving bank account information for the second entity in response to the user selecting the option to receive the payment via the ACH network.

Before explaining example embodiments consistent with the present disclosure in detail, it is to be understood that the disclosure is not limited in its application to the details of constructions and to the arrangements set forth in the following description or illustrated in the drawings. The disclosure is capable of embodiments in addition to those described and is capable of being practiced and carried out in various ways. Also, it is to be understood that the phraseology and terminology employed herein, as well as in the abstract, are for the purpose of description and should not be regarded as limiting.

It is to be understood that both the foregoing general description and the following detailed description are explanatory only and are not restrictive of the claimed subject matter.

BRIEF DESCRIPTION OF THE DRAWINGS

The accompanying drawings, which are incorporated in and constitute part of this specification, and together with the description, illustrate and serve to explain the principles of various example embodiments.

FIG. 7 illustrates an example view of a record associated with an entity, consistent with embodiments of the present disclosure.

FIG. 10 illustrates an example view of a user interface screen for entering information used to issue a check, consistent with embodiments of the present disclosure.

FIG. 11 illustrates an example view of a user interface screen for allowing a recipient to track the status of issued checks, consistent with embodiments of the present disclosure.

DETAILED DESCRIPTION OF EXAMPLE EMBODIMENTS

Figure 1:
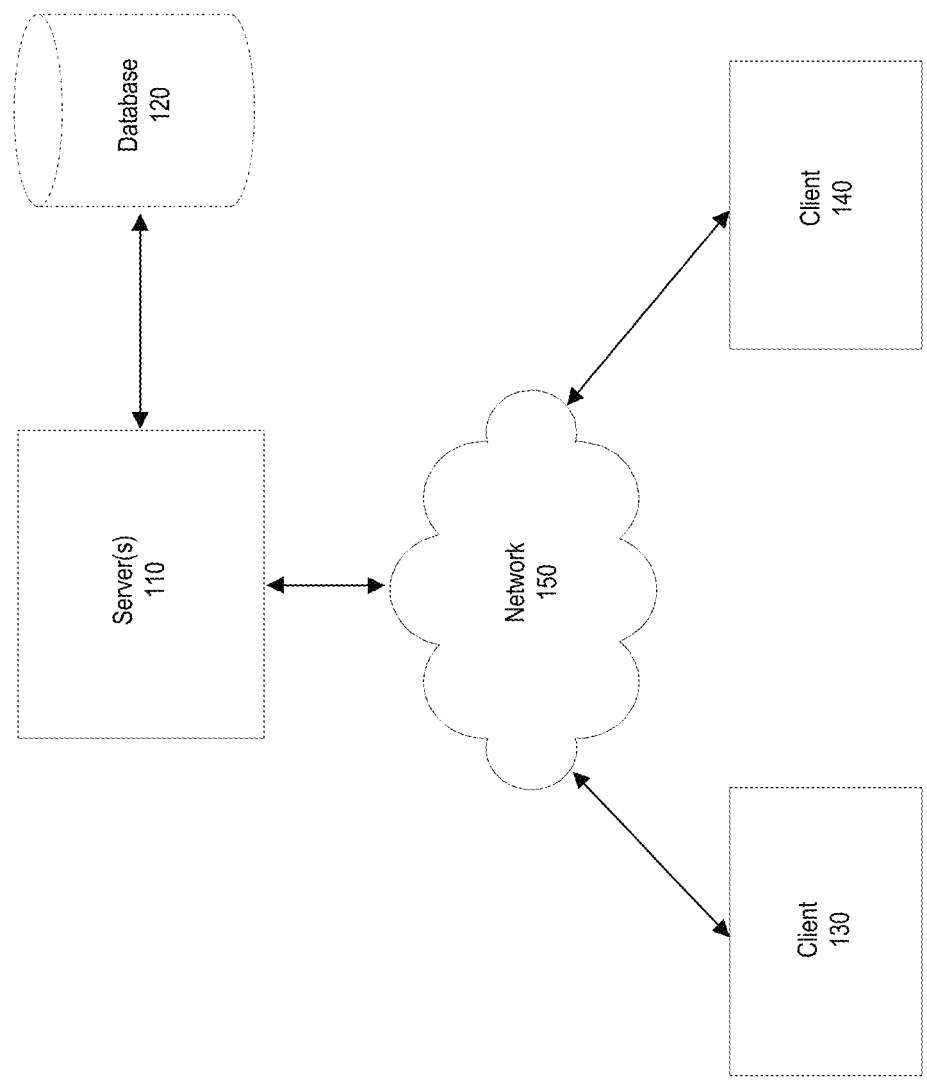
FIG. 1 illustrates an example view of a network environment for notifying an entity of a requested payment, consistent with embodiments of the present disclosure.

In the following description, numerous specific details are set forth regarding the systems and methods of the disclosed subject matter and the environment in which such systems and methods may operate in order to provide a thorough understanding of the disclosed subject matter. It will be apparent to one skilled in the art, however, that the disclosed subject matter may be practiced without such specific details, and that certain features, which are well known in the art, are not described in detail in order to avoid unnecessary complication of the disclosed subject matter. In addition, it will be understood that the embodiments provided below are exemplary, and that it is contemplated that there are other systems and methods that are within the scope of the disclosed subject matter.

Embodiments of the present disclosure relate to systems and methods for notifying an entity of a requested payment. In addition, embodiments of the present disclosure relate to solutions for identifying information about an intended recipient of a payment. Embodiments of the present disclosure also relate to solutions for sending a notification to a recipient regarding a payment. Embodiments of the present disclosure further relate to solutions for allowing a recipient to track a payment.

For thousands of years, entities, such as people or legal entities, have been exchanging money for goods or services. One of the most common ways of transferring money from one entity to another is through use of a check. A check is a document that orders a bank to pay a specific amount of money from one entity's account to the entity in whose name the check has been issued. The entity writing the check, often called the drawer, holds an account at a bank from which they can withdraw money using checks. The drawer fills out certain information when writing a check, such as the monetary amount, date, and name of the payee.

As more and more people are starting to access content over networks using electronic devices, banks are beginning to offer services to their customers to allow their customers to pay bills online. Banks offer services such as an online bill pay center, where a customer can enter the information they would typically include on a check on a website, and the bank then automatically issues a check with that information and mails it to the payee. While these bill pay systems make writing a check easier for the drawer, little has changed for the recipient. The recipient typically receives the check in the mail several days later, often with no prior notice that a check had been issued.

Embodiments of the present disclosure can improve the experience of exchanging money by check. For example, some embodiments of the present disclosure provide systems and methods that can notify an entity of a requested payment. Some embodiments of the present disclosure provide systems and methods that may allow a notification, such as an email or a text message, to be sent to an electronic device associated with an entity that is to receive payment via check. In some embodiments, a notification may allow for a system to confirm certain information about an intended recipient of a check, such as a mailing address, before the check is mailed. Thus, systems and methods of the present disclosure may make the check payment process more reliable. In some embodiments, a notification may provide an intended recipient of a check with notice of the check, allow the intended recipient to track the check, and/or allow the recipient to choose to receive payment of the check more quickly. Thus, systems and methods of the present disclosure may improve the check payment experience for the intended recipient of a check.

The term "entity," as used herein, refers to a person, a group of persons, or a legal entity, such as a corporation. As used herein, a user wishing to issue a check is an entity that is the drawer of the funds, or a person or entity authorized to issue a check from a checking account. As used herein, a recipient of a check is an entity that is the payee of the check.

FIG. 1 illustrates a block diagram of an example computing environment 100 for implementing embodiments and features of the present disclosure. The arrangement and number of components in environment 100 is provided for purposes of illustration. Additional arrangements, numbers of components, and other modifications can be made, consistent with embodiments of the present disclosure.

As shown in FIG. 1, computing environment 100 may include client devices, such as client device 130 and client device 140, connected to one or more servers 110 over one or more networks 150. Server(s) 110 may include one or more databases 120, or may be connected to one or more databases over one or more networks.

A computing environment 100 may include one or more client devices. The example provided in computing environment 100 illustrates two client devices, client device 130 and client device 140, however the disclosure is not limited to two client devices. A client device, such as client device 130 and/or client device 140, could be a mobile phone, smart phone, tablet, netbook, electronic reader, personal digital assistant (PDA), personal computer, laptop computer, smart watch, gaming device, desktop computer, set-top box, smart television, personal organizer, portable electronic device, smart appliance, navigation device, and/or other types of computing devices. In some embodiments, a client device may be implemented with hardware devices and/or software applications running thereon. A user may use a client device to communicate with server(s) 110 or one or more other client devices over network(s) 150. A client device may communicate by transmitting data to and/or receiving data from server(s) 110 or other client devices. In some embodiments, one or more client devices, such as client device 130 and/or client device 140, may be implemented using a computer system, such as computing system 1200 of FIG. 12.

Computing environment 100 may also include one or more servers 110. By way of example, server(s) 110 may include any combination of one or more of web servers, mainframe computers, general-purpose computers, personal computers, or other types of computing devices. In some embodiments, one or more of server(s) 110 may be configured to host a web page, implement a search engine, provide an online bill pay center, index information, store information, and/or retrieve information. In some embodiments, a server 110 may be a standalone computing system or apparatus, or it may be part of a larger system. For example, server(s) 110 may represent distributed servers that are remotely located and communicate over a communications network, or over a dedicated network such as a local area network (LAN). Server(s) 110 may include one or more back-end servers for carrying out one or more aspects of the present disclosure.

Server(s) 110 may be implemented as a server system comprising a plurality of servers, or a server farm comprising a load balancing system and a plurality of servers. In some embodiments, a server 110 may be implemented with hardware devices and/or software applications running thereon. A server 110 may communicate with client devices, such as client device 130 and/or client device 140 over network(s) 150, and may also communicate with one or more databases 120 over one or more networks. For example, a server 110 may communicate by transmitting data to and/or receiving data from client devices and/or databases. In some embodiments, one or more of server(s) 110 may be implemented using a computer system, such as computer system 1200 of FIG. 12.

Computing environment 100 may also include one or more databases 120. A database 120 may be a part of a server 110, or may be connected with a server 110 over one or more networks. Database(s) 120 may include any combination of one or more types of databases, such as hierarchical databases, network databases, relational databases, or object-oriented databases. A database 120 may store information related to a person's bank account, such as a person's name, bank account number, account balance, mailing address, email address, telephone number, credit limit, and/or any other type of information related to a person's banking. This information may, for example, be stored in a record associated with the person. A database may store a large collection of records associated with a number of persons. A database 120 may be searchable, such that a server 110 or client device can submit a query to the database to lookup records or information associated with banking customers. In response to such a query, a server 110 or client device may receive a list of one or more records or results that may match the submitted query. A database 120 may be implemented in software, or in a combination of software and hardware.

Database(s) 120 may be included within server(s) 110, or may be connected to server(s) 110 over one or more networks. A network may provide for the exchange of information, such as queries for information and results, between server(s) 110 and database(s) 120. A network may include one or more wide area networks (WANs), metropolitan area networks (MANs), local area networks (LANs), personal area networks (PANs), or any combination of these networks. A network may include a combination of one or more types of networks, such as Internet, intranet, Ethernet, twisted-pair, coaxial cable, fiber optic, cellular, satellite, IEEE 802.11, terrestrial, and/or other types of wired or wireless networks. In some embodiments, one or more of database(s) 120 may be implemented using a computing system, such as computer system 1200 of FIG. 12.

Computing environment 100 may also include one or more networks 150. Network(s) 150 may connect server(s) 110 with client devices, such as client device 130 and/or client device 140. Network(s) 150 may provide for the exchange of information, such as queries for information and results, between client devices and servers 110, or between client devices. Network(s) 150 may include one or more types of networks interconnecting client devices with one another, or interconnecting client devices with server(s) 110. For example, one client device, such as client device 130, may communicate with server(s) 110 using a different type of network than a second client device, such as client device 140, may use to communicate with server(s) 110.

Network(s) 150 may include one or more wide area networks (WANs), metropolitan area networks (MANs), local area networks (LANs), personal area networks (PANs), or any combination of these networks. Network(s) 150 may include a combination of one or more types of networks, such as Internet, intranet, Ethernet, twisted-pair, coaxial cable, fiber optic, cellular, satellite, IEEE 802.11, terrestrial, and/or other types of wired or wireless networks.

Figure 2:
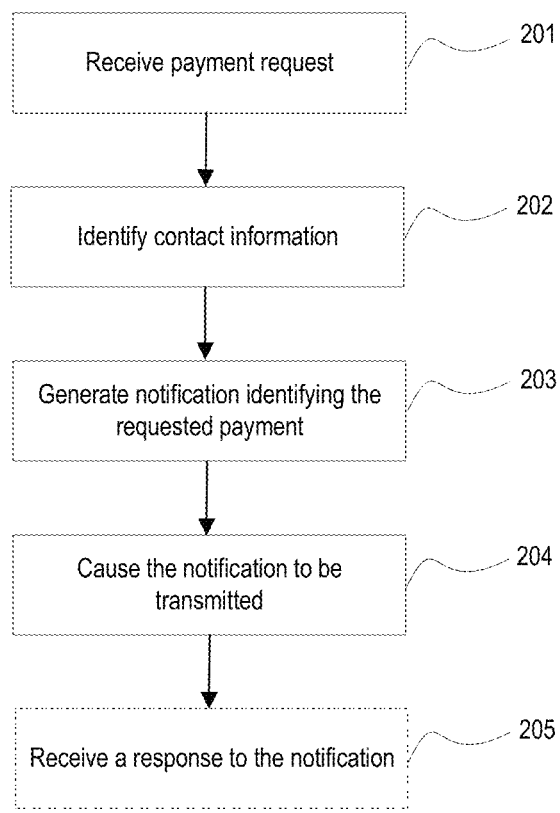
FIG. 2 illustrates an example flowchart of a method for notifying an entity of a requested payment, consistent with embodiments of the present disclosure.

FIG. 2 illustrates an example flowchart of a method 200 for notifying an entity of a requested payment, consistent with embodiments of the present disclosure. Example method 200 may be implemented in a computing environment (see, e.g., FIG. 1) using one or more computer systems (see, e.g., FIG. 12). In some embodiments, method 200 may be performed by one or more servers 110.

A user may use a client device (e.g., client device 130) to access information about the user's checking account from server(s) 110 over network(s) 150. For example, a user could use a client device to access a website hosted by server(s) 110 that provides information about the user's checking account. Alternatively, a user could access information about the user's checking account using a software application installed on a client device. Either the website or the software application may present user interface screens to the user, such that the user can select various options relating to the user's checking account. Before being granted permission to view the checking account information, a user may be required to submit access credentials. For example, a user may be required to submit a username and password. Once the correct access credentials have been submitted, server(s) 110 may provide the client device with information relating to the user's checking account.

In step 201, once the user's access credentials have been accepted and user interface screens relating to the user's checking account are being presented, a request to make a payment via check may be received from the user. For example, a user may select an option to send a check to one or more entities from a user interface screen. After the user selects an option to send a check, one or more user interface screens may be presented to the user with one or more fields for entering information relating to the check the user wishes to issue. For example, the user could type a name of a recipient into one field, an amount of a payment into one field, a date on which the check is to be issued into one field, text (e.g., a memo line) indicating the good or service for which the payment is being made into one field, and/or other information. The user may also populate fields with contact information for a recipient that is to receive the check, such as an email address, a phone number, a mailing address, or any other type of information useful in contacting an entity. One example of a user interface screen for entering information to issue a check is illustrated in view 1000 of FIG. 10.

In step 202, contact information for the payee that is to receive the payment may be identified. For example, the user wishing to send the check may have populated a field with contact information for the recipient. If the user wishing to send the check has not submitted contact information for the recipient, server(s) 110 may be able to identify contact information for the recipient by searching for that information in database(s) 120. For example, if a user submits a name of an entity that is to receive a check, but does not submit an electronic contact address, server(s) 110 may search in database(s) 120 for a record associated with the name submitted by the user. If such a record is identified, server(s) 110 may identify electronic contact information associated with the recipient if the record includes electronic contact information.

In step 203, a notification identifying the requested payment may be generated. The notification may include information submitted by the user wishing to send the check, such as the date a check is to be issued, an amount of a payment, the name of the recipient, and/or text regarding the reason for the payment. The notification may also include a name of the user issuing the check. In some embodiments, server(s) 110 may be able to generate a notification that includes an alphanumeric text string with one or more sentences that include at least a portion of the information submitted by the user. For example, if a user named "Jack" submitted information for issuing a check, such as information indicating that the amount of the check is "$50," the recipient is "John Smith," the check is to be issued on "Aug. 31, 2018" and the check is to be delivered to John Smith's mailing address, server(s) 110 may generate an alphanumeric text string for the notification stating, for example, "Hi John, Jack just wrote a check to you for $50. The check will be cut on August 31st, and will arrive at your mailing address." In some embodiments, these text strings could be generated using alphanumeric text string templates. For example, server(s) 110 may store alphanumeric text string templates such as "Hi [recipient first name], [user] just wrote a check to you for [payment amount]. The check will be cut on [issue date], and will arrive at [selected delivery method]," where the bracketed parts of the template indicate sections of the alphanumeric text string that will be filled with information the user submitted and/or with information identified from database(s) 120. In some embodiments, natural language processing (NLP) may be used to generate an alphanumeric text string to include in a notification. For example, if a user enters text for a memo line of a check, such as "happy 28th," server(s) 110 may have logic to infer that it is likely the recipients birthday. Server(s) 110 could then generate an alphanumeric text string stating, for example, "Hi John, Jack just wrote a check to you for $50 for your birthday." In some embodiments, server(s) 110 may look for records corresponding to an identified recipient, to determine whether any additional information in such a record may be useful to generate a notification for the recipient. If such a record does exist, server(s) 110 may use that information to add additional text to the alphanumeric text string in the notification.

In step 204, the notification may be transmitted from server(s) 110 to a client device associated with the recipient based on the identified contact information. For example, if the identified contact information is an email address, an email message with the notification may be sent to a client device associated with the recipient. If the identified contact information is a phone number, a text message, such as a Short Message Service (SMS) message or a Multimedia Messaging Service (MMS) message, with the notification may be sent to a client device associated with the recipient. In some embodiments, if an email address and a phone number are identified as associated with an entity, both an email message and a text message containing the notification may be sent to a client device associated with the recipient.

In some embodiments, the notification may be generated to include an option for the recipient to respond to the notification in some way. For example, the notification could request confirmation of the recipient's address, and the recipient may be allowed to respond to the notification to confirm that the address is correct or incorrect. In some embodiments, the notification may allow the recipient to track the status of the mailing of the check. For example, a recipient may be allowed to respond to the notification or to click a link in the notification in order to receive additional information on the recipient's client device regarding the status of the mailing of the check. In some embodiments, the notification may provide information indicating that the recipient can receive payment of the check more quickly over an automated clearing house (ACH) network. The recipient may be allowed to respond with the recipient's banking information, so that payment can be sent more quickly over the ACH network. If the notification included an option to respond to the notification in some way, then in step 205 a response to the notification may be received at server(s) 110 from the recipient's client device. The response could be, for example, a response email if the notification were included in an email to the recipient. The response could be a response text message if the notification were included in a text message to the recipient. The response could also be a request for a web page in response to the recipient having clicked a link in the notification.

Figure 3:
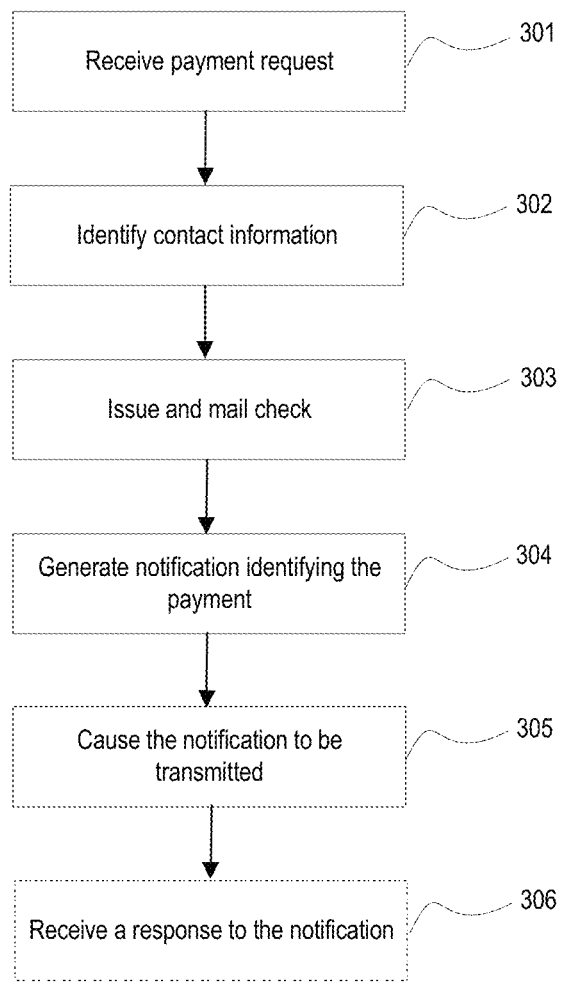
FIG. 3 illustrates an example flowchart of another method for notifying an entity of a requested payment, consistent with embodiments of the present disclosure.

FIG. 3 illustrates an example flowchart of a method 300 for notifying an entity of a requested payment, consistent with embodiments of the present disclosure. Example method 300 may be implemented in a computing environment (see, e.g., FIG. 1) using one or more computer systems (see, e.g., FIG. 12). In some embodiments, method 300 may be performed by one or more servers 110.

A user may use a client device to access information about the user's checking account from server(s) 110 over network(s) 150. For example, a user could use a client device to access a website hosted by server(s) 110 that provides information about the user's checking account. Alternatively, a user could access information about the user's checking account using a software application installed on a client device. Either the website or the software application may present user interface screens to the user, such that the user can select various options related to the user's checking account. Before being granted permission to view the checking account information, a user may be required to submit access credentials. For example, a user may be required to submit a username and password. Once the correct access credentials have been submitted, server(s) 110 may provide the client device with information relating to the user's checking account.

In step 301, once the user's access credentials have been accepted and user interface screens regarding the user's checking account are being presented, a request to make a payment via check may be received from the user. For example, a user may select an option to send a check to one or more entities from a user interface screen. After the user selects an option to send a check, one or more user interface screens may be presented to the user with one or more fields for entering information relating to the check the user wishes to issue. For example, the user could type a name of a recipient into one field, an amount of a payment into one field, a date on which the check is to be issued into one field, text (e.g., a memo line) indicating the good or service for which the payment is being made into one field, and/or other information. The user may also populate fields with contact information for a recipient that is to receive the check, such as an email address, a phone number, a mailing address, or any other type of information useful in contacting an entity. One example of a user interface screen for entering information to issue a check is illustrated in view 1000 of FIG. 10.

In step 302, contact information for the payee that is to receive the payment may be identified. For example, the user wishing to send the check may have populated a field with contact information for the recipient. If the user wishing to send the check has not submitted contact information for the recipient, server(s) 110 may be able to identify contact information for the recipient by searching in database(s) 120. For example, if a user submits a name of an entity that is to receive a check, but does not submit a contact address, server(s) 110 may search in database(s) 120 for a record associated with the name submitted by the user. If such a record is identified, server(s) 110 may identify contact information associated with the recipient if the record includes contact information.

In step 303, a check may be issued and mailed. That is, server(s) 110 may cause a paper check to be printed and mailed to the recipient at the recipient's address based on the information received from the user in submitting the payment request and/or information identified in a record in database(s) 120. The check may be issued to the recipient identified by the user, in the amount specified by the user, on the date specified by the user.

In step 304, a notification identifying the payment may be generated. Because the check has already been issued and mailed, the notification may relate to the already issued check. The notification may include information, such as the date the check was issued, an amount of the payment, and text regarding the reason for the payment. In some embodiments, server(s) 110 may be able to generate a notification that includes an alphanumeric text string with one or more sentences that include at least a portion of the information submitted by the user issuing the check. For example, if a user named "Jack" submitted information for issuing a check, such as information indicating that the amount is "$50," the recipient is "John Smith," and the check is to be delivered to John Smith's mailing address, server(s) 110 may generate a text string for the notification stating, for example, "Hi John, Jack just wrote a check to you for $50. The check was cut on June 16th, and is expected to arrive at your mailing address within three business days." In some embodiments, these alphanumeric text strings could be generated using alphanumeric text string templates. For example, server(s) 110 may store alphanumeric text string templates such as "Hi [recipient first name], [user] just wrote a check to you for [payment amount]. The check was cut on [issue date], and will arrive at [selected delivery method] within [expected delivery time]," where the bracketed parts of the template indicate sections of the alphanumeric text string template that will be filled with information the user submitted and/or with information identified from database(s) 120. In some embodiments, natural language processing (NLP) may be used to generate an alphanumeric text string to include in a notification. For example, if a user enters text for a memo line of a check, such as "happy 28th," server(s) 110 may have logic to infer that it is likely the recipient's birthday. Server(s) 110 could then generate an alphanumeric text string stating, for example, "Hi John, Jack mailed a check to you for $50 for your birthday." In some embodiments, server(s) 110 may look for records corresponding to an identified recipient, to determine whether any additional information in such a record may be useful to generate a notification for the recipient. If such a record does exist, server(s) 110 may use that information to add additional text to the alphanumeric text string in the notification.

In some embodiments, the notification may indicate a date by which the issued check is going to expire. For example, the notification may include an alphanumeric text string such as "Hi John, the check that Jack wrote you for $50 is going to expire in 3 days. Please deposit the check if you have not already done so." In some embodiments, system(s) 110 may generate such a notification upon determining that the check that had been issued has not been deposited, and is going to expire in a certain time period (e.g., 3 days).

In step 305, the notification may be transmitted from server(s) 110 to a client device associated with the recipient based on the identified contact information. For example, if the identified contact information is an email address, an email message with the notification may be sent to a client device associated with the recipient. If the identified contact information is a phone number, a text message, such as an SMS message or a MMS message, with the notification may be sent to a client device associated with the recipient. In some embodiments, if an email address and a phone number are identified as associated with an entity, both an email message and a text message containing the notification may be sent to a client device associated with the recipient.

In some embodiments, the notification may be generated to include an option for the recipient to respond to the notification in some way. In method 300, the check has already been issued and mailed. In some embodiments, the notification may allow the recipient to respond such that the recipient can track the delivery status of the check. For example, a recipient may be allowed to respond to the notification or to click a link in the notification in order to receive additional information on the recipient's client device regarding the status of the mailing of the check. If the notification included an option to respond to the notification in some way, then in step 305 a response to the notification may be received from the recipient's client device. The response could be, for example, a response email if the notification were included in an email to the recipient. The response could be a response text message if the notification were included in a text message to the recipient. The response could also be a request for a web page in response to the recipient having clicked a link in the notification.

Although method 300 illustrates identifying contact information in step 302 prior to issuing and mailing a check in step 303, the disclosure is not so limited. Server(s) 110 could, for example, issue and/or mail the check before determining whether any contact information for the recipient exists in database(s) 120. For example, a check could be mailed to a mailing address identified by a user in step 301, and, after the check is mailed, server(s) 110 may identify one or more electronic contact addresses associated with the recipient in database(s) 120.

Figure 4:
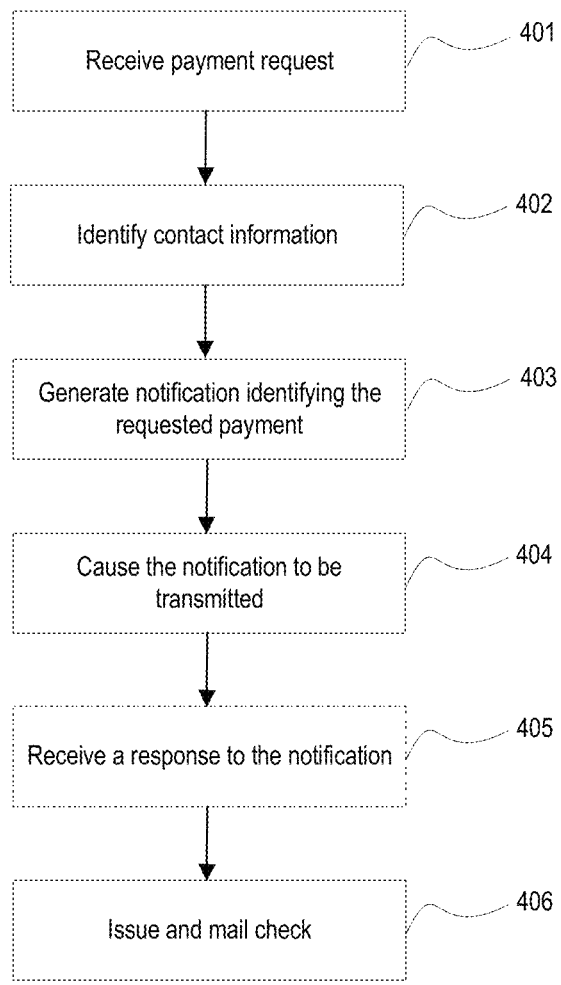
FIG. 4 illustrates an example flowchart of a still another method for notifying an entity of a requested payment, consistent with embodiments of the present disclosure.

FIG. 4 illustrates an example flowchart of a method 400 for notifying an entity of a requested payment, consistent with embodiments of the present disclosure. Example method 400 may be implemented in a computing environment (see, e.g., FIG. 1) using one or more computer systems (see, e.g., FIG. 12). In some embodiments, method 400 may be performed by one or more servers 110.

A user may use a client device to access information about the user's checking account from server(s) 110 over network(s) 150. For example, a user could use a client device to access a website associated with the user's checking account hosted by server(s) 110. Alternatively, a user could access the information about the user's checking account using a software application installed on a client device. Either the website or the software application may present user interface screens to the user, such that the user can select various options relating to the user's checking account. Before being granted permission to view the checking account information, a user may be required to submit access credentials. For example, a user may be required to submit a username and password. Once the correct access credentials have been submitted, server(s) 110 may provide the client device with information relating to the user's checking account.

In step 401, once the user's access credentials have been accepted and user interface screens regarding the user's checking account are being presented, a user may select an option to send a check to one or more entities. For example, a user may select an option to send a check to one or more entities from a user interface screen. After the user selects an option to send a check, one or more user interface screens may be presented to the user with one or more fields for entering information relating to the check the user wishes to issue. For example, the user could type a name of a recipient into one field, an amount of a payment into one field, a date on which the check is to be issued into one field, text indicating the good or service for which the payment is being made into one field, and/or other information. The user may also populate fields with contact information for a recipient that is to receive the check, such as an email address, a phone number, a mailing address, or any other type of information useful in contacting an entity.

In step 402, contact information for the payee that is to receive the payment may be identified. For example, the user wishing to send the check may have populated a field with contact information for the recipient. If the user wishing to send the check has not submitted contact information for the recipient, server(s) 110 may be able to identify contact information for the recipient by searching in database(s) 120. For example, if a user submits a name of an entity that is to receive a check, but does not submit a contact address, server(s) 110 may search in database(s) 120 for a record associated with the name submitted by the user. If such a record is identified, server(s) 110 may identify contact information associated with the recipient if the record includes contact information.

In step 403, a notification identifying the requested payment may be generated. Because the check has not yet been issued and mailed (to be issued and mailed in step 406), the notification may include information about the check that is to be issued. The notification may include information submitted by the user wishing to send the check, such as the date a check is to be issued, an amount of a payment, and text regarding the reason for the payment. In some embodiments, server(s) 110 may be able to generate a notification that includes an alphanumeric text string with one or more sentences that include at least a portion of the information submitted by the user. For example, if a user named "Jack" submitted information for issuing a check, such as information indicating that the amount is "$50," the payee is "John Smith," the check is to be issued on "Aug. 31, 2018" and the check is to be delivered to John Smith's mailing address, computer system(s) may generate a text string for the notification stating, for example, "Hi John, Jack just wrote a check to you for $50. The check will be cut on August 31st, and will arrive at your mailing address." In some embodiments, these alphanumeric text strings could be generated using alphanumeric text string templates. For example, server(s) 110 may store alphanumeric text string templates such as "Hi [recipient first name], [user] just wrote a check to you for [payment amount]. The check will be cut on [issue date], and will arrive at [selected delivery method]," where the bracketed parts of the template indicate sections of the alphanumeric text string that will be filled with information the user submitted and/or with information from database(s) 120. In some embodiments, natural language processing (NLP) may be used to generate an alphanumeric text string to include in a notification. For example, if a user enters text for a memo line of a check, such as "happy 28th," server(s) 110 may have logic to infer that it is likely the recipients birthday. Server(s) 110 could then generate an alphanumeric text string stating, for example, "Hi John, Jack just wrote a check to you for $50 for your birthday." In some embodiments, server(s) 110 may look for records corresponding to an identified recipient, to determine whether any additional information in such a record may be useful to generate a notification for the recipient. If such a record does exist, server(s) 110 may use that information to add additional text to the notification.

In step 404, the notification may be transmitted from server(s) 110 to a client device associated with the recipient based on the identified contact information. For example, if the identified contact information is an email address, an email message with the notification may be sent to a client device associated with the recipient. If the identified contact information is a phone number, a text message, such as an SMS or MMS message, with the notification may be sent to a client device associated with the recipient. In some embodiments, if an email address and a phone number are identified as associated with an entity, both an email message and a text message containing the notification may be sent to a client device associated with the recipient.

In some embodiments, the notification may be generated to include an option for the recipient to respond to the notification in some way. For example, the notification could request confirmation of the recipient's address, and the recipient may be allowed to respond to the notification to confirm that the address is correct or incorrect. In some embodiments, the notification may provide information indicating that the recipient can receive payment of the check more quickly over an ACH network. The recipient may be allowed to respond with the recipient's banking information, so that payment can be sent more quickly over the ACH network. If the notification included an option to respond to the notification in some way, then in step 405 a response to the notification may be received from the recipient's client device. The response could be, for example, a response email if the notification were included in an email to the recipient. The response could be a response text message if the notification were included in a text message to the recipient. The response could also be a request for a web page in response to the recipient having clicked a link in the notification.

In step 406, a check may be issued and mailed. That is, server(s) 110 may cause a paper check to be printed and mailed to the recipient's address based on the information received from the user in submitting the payment request. The check may be issued to the recipient identified by the user, in the amount specified by the user, on the date specified by the user. In some embodiments, a notification may have been sent in step 404 requesting that the recipient confirm the recipient's mailing address, or that the recipient can receive the payment via ACH if the recipient responds to the notification with banking information. In such a situation, the check may be issued and mailed in step 406 using the information already of record at server(s) 110 if a response to the notification has not been received some predetermined period of time after the notification was sent (e.g., 3 days). In some embodiments, if a notification was sent in step 404 requesting that the recipient confirm the recipient's mailing address, and in step 405 the recipient responds to the notification with a new mailing address, then in step 406 the check may be issued and mailed to the new mailing address. In such a situation, system(s) 110 may update records associated with the recipient to include the new mailing address.

In some embodiments, the user wishing to send a payment via a check may enter information to have the check issued, as discussed above, but opt not to have a notification sent to the recipient. For example, a user interface screen, such as the example user interface screen illustrated in view 1000 of FIG. 10, may include an option that the user may select if they want to notify the recipient about the check, or that the user may deselect if they do not want to notify the recipient about the check. In some embodiments, after the user has entered the information for issuing the check and has selected to issue the check, server(s) 110 may prompt the user asking whether the user wishes to have a notification sent to the recipient.

In some embodiments, server(s) 110 may create and/or update records in database(s) 120 based on information server(s) 110 receive about recipients. For example, server(s) 110 may receive information about recipients, such as mailing addresses and contact addresses, from users wishing to issue a check. Server(s) 110 may also receive information about recipients, such as mailing addresses, contact addresses, and/or banking information, from recipients based on information provided by recipients in response to notifications. By creating and/or updating records in database(s) 120 with this information, the information may be reused in future payment requests. For example, if a recipient provides banking information, the next time a user requests to send a check to the recipient, the payment may be sent to the recipient by ACH network rather than having to issue a paper check. As another example, if a recipient provides an updated mailing address, this updated mailing address may be used to mail future checks from users. If a user wishing to issue a check were to enter an old address associated with a recipient, system(s) 110 may identify the newer address in a record associated with the recipient, and may prompt the user to ask whether they wish to have the check mailed to the newer address on file.

In some embodiments, recipients may provide server(s) 110 with one or more preferences in response to a notification. The preference(s) may then be stored in a record associated with the recipient in database(s) 120, for reuse in future payment requests. For example, a recipient receiving a notification may respond to the notification with a preference to opt out of future notifications. As another example, a recipient receiving a notification via one contact address, such as email, may elect to receive future notifications via another contact address, such as via text message using a phone number. As still another example, a recipient may elect whether or not to store banking information for future use, so that payments may be paid to the recipient via ACH network in the future. In some embodiments, a recipient may elect to receive notifications on a less frequent basis. For example, a recipient receiving many checks and many notifications, such as a business owner, may elect to receive all notifications at a certain frequency, such as once daily or once weekly.

In some embodiments, a notification may include a link, such as a universal resource locator (URL) to a website. The URL may include a number of query parameters indicating information about the requested check payment, such as a combination of one or more of a name of the recipient, a name of the user sending the payment, a check number, a transaction number, a bank account number, or any other type of information that might identify the payment. When a recipient clicks the URL, the query parameters on the URL may be used by server(s) 110 to query database(s) 120, and provide a webpage with information about the payment to the recipient, such as the status of the payment. In some embodiments, the link may expire after a certain number of days (e.g., 3 days) or after a certain number of accesses (e.g., 3 accesses), for security reasons. In some embodiments, one or more of the query parameters may be obfuscated, so that information about the check payment (e.g., name of the user sending the payment, user's bank account number) are not easily visible to a person viewing the URL. For example, one or more of the query parameters may be hashed versions of the parameters, such as a hashed version of a user's name or bank account number. As another example, one or more of the query parameters may be an identifier for a database key that can be used by server(s) 110 to query database(s) 120 to lookup information about the payment to the recipient, such as the name of the user sending the payment or the user's bank account number. In some embodiments, all of the query parameters in a URL may be obfuscated using one of these techniques.

In some embodiments, a notification may include a link, such as a URL to a website. If the recipient clicks on the link, the recipient's client device may be provided with a webpage from server(s) 110 that allows the recipient to enroll in an online transaction system. Enrolling with the online transaction system may provide a recipient with certain conveniences. For example, the online transaction system may assist the recipient with storing a variety of preferences for future notifications. The online transaction system may also provide the recipient with the ability to track the status of checks by providing a user interface screen, such as the example user interface screen shown in view 1100 of FIG. 11.

Figures 5, 6:
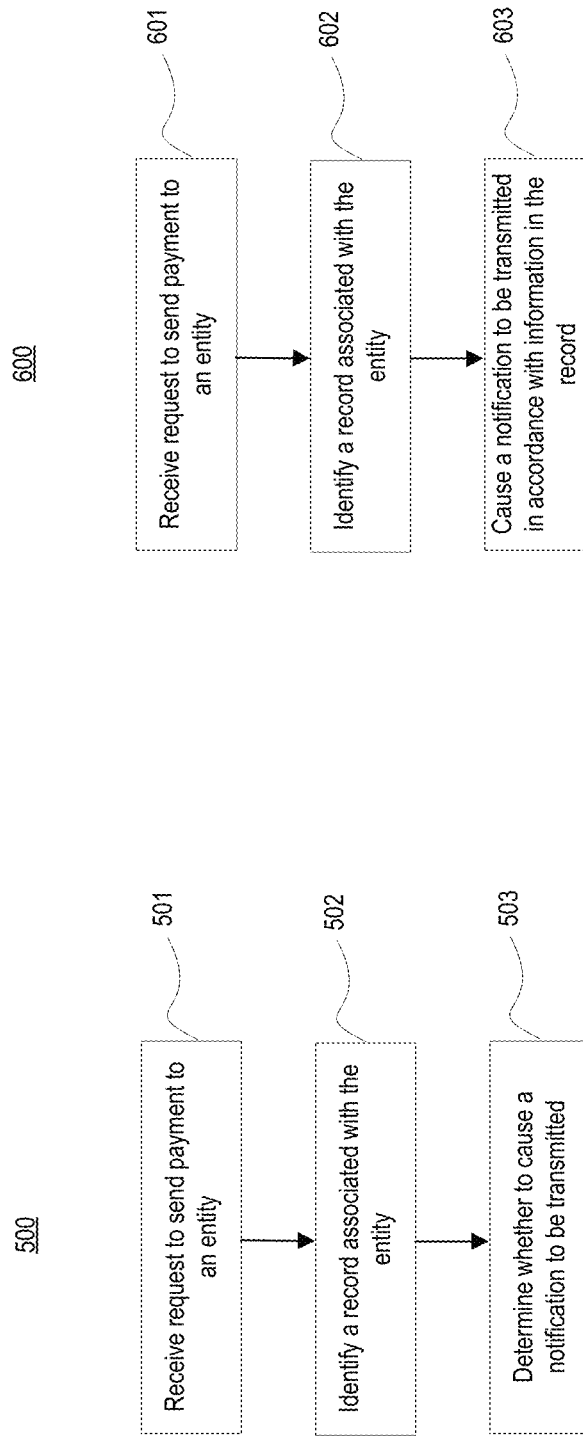
FIG. 5 illustrates an example flowchart of a method for determining whether to notify an entity of a requested payment, consistent with embodiments of the present disclosure.
FIG. 6 illustrates an example flowchart of a method for causing a notification to be transmitted in accordance with information stored in a record, consistent with embodiments of the present disclosure.

FIG. 5 illustrates an example flowchart of a method for determining whether to notify an entity of a requested payment, consistent with embodiments of the present disclosure. Example method 500 may be implemented in a computing environment (see, e.g., FIG. 1) using one or more computer systems (see, e.g., FIG. 12). In some embodiments, method 500 may be performed by one or more servers 110.

Like in steps 201, 301, and 401 described above, in step 501 a request to send payment to an entity via check is received. In step 502, information entered by the user requesting to send payment is used to identify a record associated with a recipient in database(s) 120. The record may store one or more preferences for notifications, as previously described. In step 503, a determination may be made as to whether to cause a notification to be transmitted to the recipient. For example, server(s) 110 may identify a preference in a record associated with the recipient. The preference may indicate that the recipient desires to receive notifications, or that the recipient does not desire to receive notifications. In step 503, a determination may be made as to whether to cause a notification to be transmitted to the recipient based on the preference stored in the record.

FIG. 6 illustrates an example flowchart of a method for causing a notification to be transmitted in accordance with information stored in a record, consistent with embodiments of the present disclosure. Example method 600 may be implemented in a computing environment (see, e.g., FIG. 1) using one or more computer systems (see, e.g., FIG. 12). In some embodiments, method 600 may be performed by one or more servers 110.

Like in steps 201, 301, and 401 described above, in step 601 a request to send payment to an entity via check is received. In step 602, information entered by the user requesting to send payment is used to identify a record associated with a recipient in database(s) 120. The record may store one or more preferences for notifications, as previously described. In step 603, a determination may be made as to how to send a notification. For example, server(s) 110 may identify a preference in a record associated with the recipient. The preference may indicate that the recipient desires to receive notifications at a certain frequency (e.g., once a day), and in step 603, server(s) 110 may cause the notification to be sent with other notifications at a certain time of day based on the preference. As another example, the preference may indicate that the user wishes to receive notifications by email, by text message, or both. In step 603, server(s) 110 may cause a notification to be sent by email, by text message, or both, in accordance with the recipient's preference.

FIG. 7 illustrates an example view 700 of a record associated with an entity, such as a recipient, consistent with embodiments of the present disclosure. Such a record may be stored, for example, in database(s) 120.

A record associated with an entity may store a variety of information. For example, a record may store a name of the entity. A record may also store bank account information, such as a bank name, a bank routing number, and/or a bank account number. A record may store electronic contact addresses for the entity, such as a telephone number and/or an email address. A record may store one or more mailing addresses for an entity, such as a home mailing address, a vacation home mailing address, or a old mailing address. A record may also store one or more preferences for an entity, such as whether the entity wishes to receive notifications, how frequently the entity wishes to receive notifications, a preferred electronic contact address for receiving the notifications, and/or whether the entity wishes to receive payment by mail or by ACH. Although the example record illustrated in view 700 of FIG. 7 illustrates a variety of information, a record may include more or less information than the information illustrated in view 700. For example, a record may store only a name and a mailing address.

Server(s) 110 may use records in database(s) 120 as a check against information submitted by a user wishing to issue a payment. For example, if a user enters "John Smith" as a recipient for a check, and a record is stored for "John Smith" in database(s) 120, server(s) 110 may check information stored in the record against any information entered by the user. For example, if the user entered a mailing address of "21 Abc Road" for John Smith, based on the record illustrated in view 700, server(s) 110 may prompt the user and ask whether they intended to enter "12 Abc Road," as that is the address stored in the record. If a name entered by a user does not exactly match a name of a record in the database, server(s) 110 may ask the user whether they intended a particular name associated with a stored record. For example, if the user entered "J. Smith" as the name of the recipient, based on the record shown in view 700, server(s) 110 may ask the user whether they are referring to the "John Smith" for which a record is stored. Thus, the records in database(s) 120 may be used to provide information for recipients, and also as a check to help ensure that the user wishing to issue a check has entered information correctly.

Figure 8C:
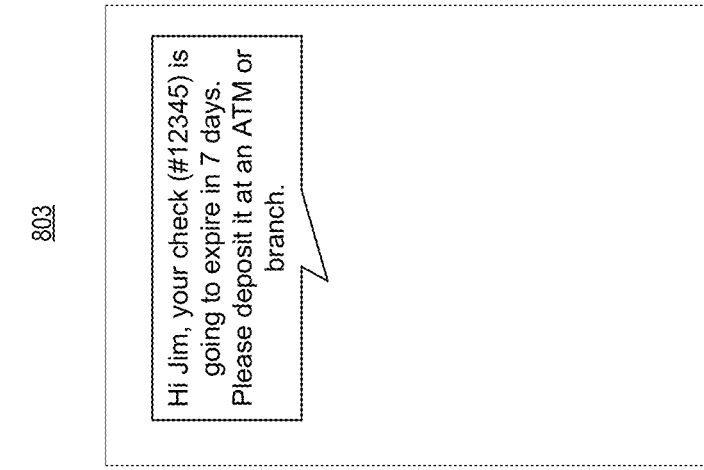
FIG. 8C illustrates an example view of still another notification regarding a requested payment, consistent with embodiments of the present disclosure.
Figure 8B:
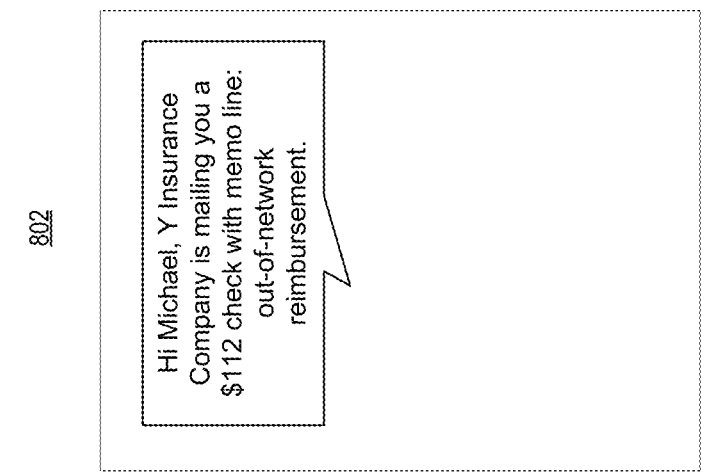
FIG. 8B illustrates an example view of another notification regarding a requested payment, consistent with embodiments of the present disclosure.
Figure 8A:
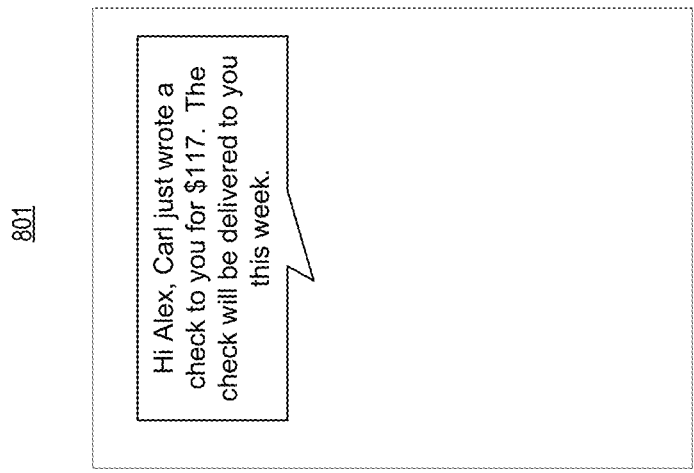
FIG. 8A illustrates an example view of a notification regarding a requested payment, consistent with embodiments of the present disclosure.

FIGS. 8A-8C illustrate views 801, 802, 803 of example notifications regarding requested payments, consistent with embodiments of the present disclosure. The views are examples of what a notification may look like displayed on a recipient's client device. For example, view 801 of FIG. 8A illustrates an example notification to a recipient named Alex, indicating that a user Carl wrote Alex a check for an amount of $117. The notification indicates that the check will be delivered to Alex this week. View 802 of FIG. 8B illustrates an example notification to a recipient named Michael, indicating that Y Insurance Company is in the process of mailing Michael a check for an amount of $112, and that the check includes a memo line "out-of-network reimbursement." View 803 of FIG. 8C illustrates an example notification to a recipient named Jim, indicating that a check that has already been mailed to Jim, check number 12345, is going to expire in 7 days. The notification requests that Jim deposit the check at an automated teller machine (ATM) or branch.

Figure 9C:
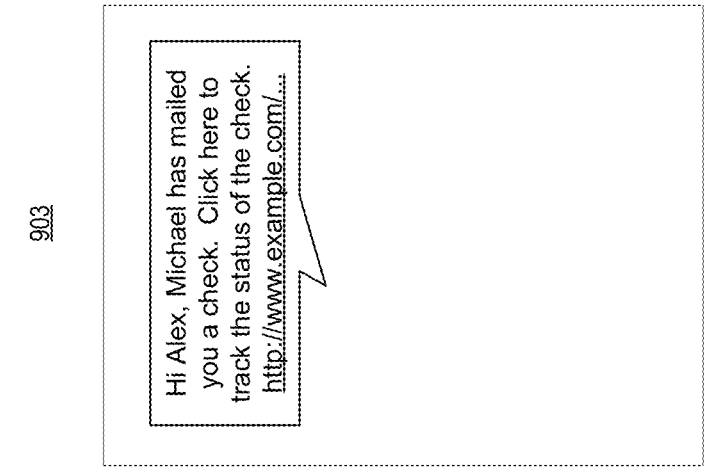
FIG. 9C illustrates an example view of still another notification with an option to respond, consistent with embodiments of the present disclosure.
Figure 9B:
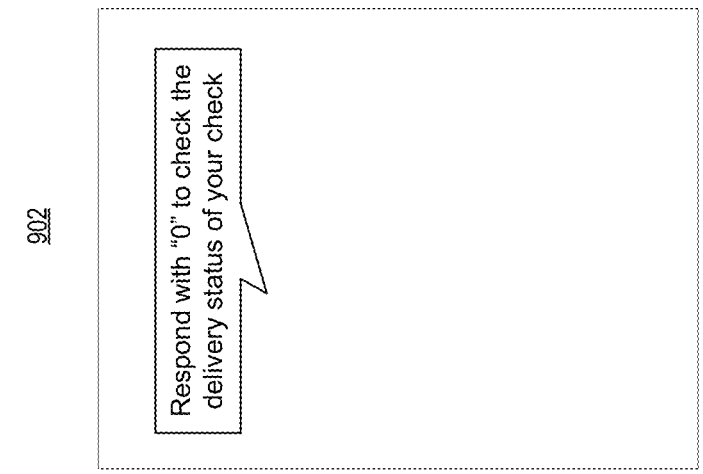
FIG. 9B illustrates an example view of another notification with an option to respond, consistent with embodiments of the present disclosure.
Figure 9A:
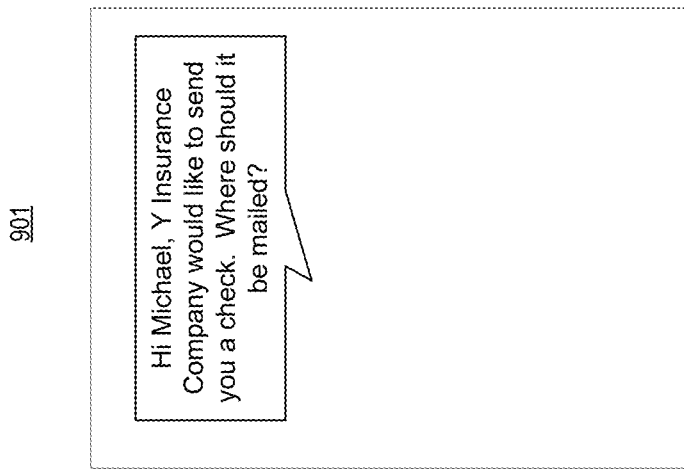
FIG. 9A illustrates an example view of a notification with an option to respond, consistent with embodiments of the present disclosure.

FIGS. 9A-9C illustrate views 901, 902, 903 of example notifications regarding requested payments with options to respond, consistent with embodiments of the present disclosure. The views are examples of what a notification may look like displayed on a recipient's client device. For example, view 901 of FIG. 9A illustrates an example notification to a recipient named Michael indicating that Y Insurance Company would like to send him a check. The notification asks Michael to respond with a mailing address. View 902 of FIG. 9B illustrates an example notification to a recipient noting that the recipient can respond with a message "0" to receive information about the delivery status of a check. View 903 of FIG. 9C illustrates an example notification to a recipient named Alex indicating that Michael has mailed him a check. The notification provides a link with a URL, and notes that Alex can click on the link to check on the status of the check.

Views 801, 802, 803, 901, 902, 903 are provided as examples of notifications. One of skill in the art would recognize that a variety of different notifications may be sent to recipients, consistent with embodiments of the present disclosure.

FIG. 10 illustrates an example view 1000 of a user interface screen for entering information used to issue a check, consistent with embodiments of the present disclosure. The user interface screen may be provided, for example, on a website hosted by server(s) 110, or in a software application installed on a client device.

As shown in the example user interface in view 1000, once a user has logged into an online banking system, the user may request to issue a check and may provide certain information for the check. The user may provide, for example, a recipient name, a recipient mailing address, an amount, a date to issue the check, a recipient email address, a recipient phone number, and/or a memo line with text indicating the reason for the payment. Server(s) 110 may check to see whether additional information for an identified recipient is available in database(s) 120, or may use information from database(s) 120 as a check against the information entered by the user.

Although a variety of fields are illustrated in the example shown in view 1000, the disclosure is not so limited. One of skill in the art would recognize that more or less fields may be provided. A user may also optionally leave certain fields blank. For example, a user may enter a recipient's name, but may not have the recipient's mailing address handy. Server(s) 110 may then check for a record associated with the recipient in database(s) 120, and if such a record is available, a mailing address from that record may be used for mailing the check.

FIG. 11 illustrates an example view 1100 of a user interface screen for allowing a recipient to track the status of issued checks, consistent with embodiments of the present disclosure. The user interface screen may be provided, for example, on a website hosted by server(s) 110, or in a software application installed on a client device.

View 1100 is an example of a user interface screen that may be provided on a client device if a recipient has enrolled in an online transaction system, as previously discussed. If a recipient has enrolled in an online transaction system, the recipient may login in to the online transaction system to check on the status of checks that have been issued to the recipient. In the example shown in view 1100, a check for $75.42 was issued on Apr. 21, 2018 from Max Samuelson to the recipient, and has been mailed, with delivery expected in three days. View 1100 also illustrates that a check for $25.62 was issued on Mar. 30, 2018 from Alex Thompson, and has been received, and that a check for $50.00 was issued on Mar. 16, 2018 from John Smith, and has been received.

Although the example user interface screen in view 1100 of FIG. 11 illustrates certain information about certain payments, it is merely an example. A variety of information about payments may be provided. Moreover, one of skill in the art would recognize that, once a recipient has enrolled in the online transaction system, the recipient may be provided with a variety of user interface screens for creating or updating various preferences for future check payments and/or notifications.

Figure 12:
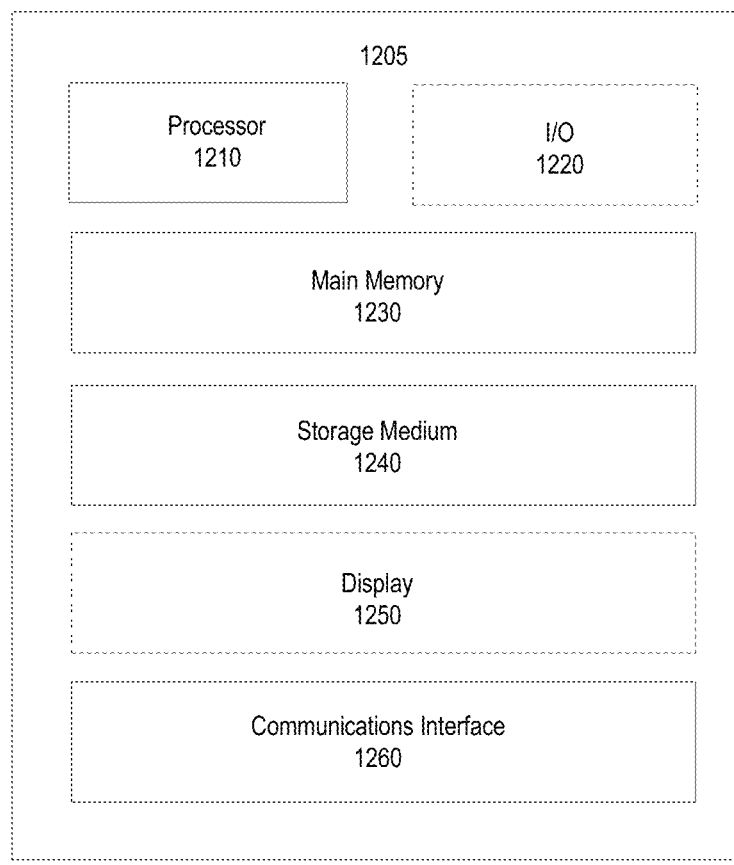
FIG. 12 illustrates an example computer system for implementing embodiments and features consistent with the present disclosure.

FIG. 12 illustrates an example computer system 1200 for implementing embodiments and features consistent with the present disclosure. Computer system 1200 may include one or more computing devices 1205. A computing device may include one or more processors 1210 for executing instructions. Processors suitable for the execution of instructions include, by way of example, both general and special purpose microprocessors, and any one or more processors of any kind of digital computer. A computing device 1205 may also include one or more input/output (I/O) devices 1220. By way of example, I/O devices 1220 may include keys, buttons, mice, joysticks, styluses, gesture sensors (e.g., video cameras), motion sensors (e.g, infrared sensors, ultrasound sensors), voice sensors (e.g., microphones), etc. Keys and/or buttons may be physical and/or virtual (e.g., provided on a touch screen interface).

A computing device 1205 may include one or more storage devices configured to store data and/or software instructions used by processor(s) 1210 to perform operations consistent with the disclosed embodiments. For example, a computing device 1205 may include main memory 1230 configured to store one or more software programs that, when executed by processor(s) 1210, cause processor(s) 1210 to perform functions or operations consistent with disclosed embodiments. By way of example, main memory 1230 may include NOR or NAND flash memory devices, read only memory (ROM) devices, random access memory (RAM) devices, etc. A computing device 1205 may also include one or more storage medium(s) 1240. By way of example, storage medium(s) 1240 may include hard drives, solid state drives, tape drives, redundant array of independent disks (RAID) arrays, etc. Although FIG. 12 illustrates only one main memory 1230 and one storage medium 1240, a computing device 1205 may include any number of main memories 1230 and storage mediums 1240. Further, although FIG. 12 illustrates main memory 1230 and storage medium 1240 as part of computing device 1205, main memory 1230 and/or storage medium 1240 may be located remotely and computing device 1205 may be able to access main memory 1230 and/or storage medium 1240 via one or more network(s).

Storage medium(s) 1240 may be configured to store data, and may store data received from one or more of server(s) 110, database(s) 120, or client devices (e.g., client device 130, client device 140). The data may take or represent various content or information forms, such as documents, textual content, graphical content, and any other type of information and/or content in which a user may be interested, or any combination thereof. The data may further include other data received, stored, and/or inferred by computer system 1200, such as user preference information and/or any other data used for carrying out embodiments of the present disclosure.

A computing device 1205 may also include one or more displays (not shown). Display(s) may be implemented using one or more display panels, which may include, for example, one or more cathode ray tube (CRT) displays, liquid crystal displays (LCDs), plasma displays, light emitting diode (LED) displays, organic light emitting diode (OLED) displays, touch screen type displays, projector displays (e.g., images projected on a screen or surface, holographic images, etc.), field emission displays (FEDs), active matrix displays, vacuum fluorescent (VFR) displays, 3-dimensional (3-D) displays, electronic paper (e-ink) displays, microdisplays, or any combination of the above types of displays.

A computing device 1205 may further include one or more communications interfaces 1260. Communication interface(s) 1260 may allow content, software, data, messages, and/or other information to be transferred between server(s) 110, database(s) 120, and client devices (e.g., client device 130, client device 140). Examples of communication interface(s) 1260 may include modems, network interface cards (e.g., an Ethernet card), communications ports, personal computer memory card international association (PCMCIA) slots and card, antennas, etc. Communication interface(s) 1260 may transfer software, content, data, messages, or other information in the form of signals, which may be electronic, electromagnetic, optical, and/or other types of signals. The signals may be provided to/from communications interface 1260 via a communication path (e.g., network(s) 150), which may be implemented using wired, wireless, cable, fiber optic, radio frequency (RF), and/or other communication channels.

A computer system 1200 may have additional or fewer components depending on whether the computer system is a client device (e.g., client device 130, client device 140), server 110, or database 120. For example, a server 110 and/or database 120 may not have input/output device(s) 1220. A server 110 and/or device 120 may also not have display(s) 1250.

The subject matter disclosed herein can be implemented in digital electronic circuitry, or in computer software, firmware, or hardware, including the structural means disclosed in this specification and structural equivalents thereof, or in combination of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of computer programs include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, certain computers might also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices (e.g., EPROM, EEPROM, and flash memory devices), magnetic disks (e.g., internal hard disks or removable disks); magneto optical disks; and optical disks (e.g., CD and DVD disks). The processor and the memory can be supplemented by, or incorporated in, special purpose logic circuitry.

To provide for interaction with a user, some subject matter described herein can be implemented on a computer having a display device, e.g., a CRT (cathode ray tube) or LCD (liquid crystal display) monitor, for displaying information to the user, and a keyboard and a pointing device (e.g., a mouse, trackball, touchscreen), by which the user can provide input to the computer. Other kinds of devices can be used to provide for interaction with a user as well. For example, feedback provided to the user can be any form of sensory feedback (e.g., visual feedback, auditory feedback, or tactile feedback), and input from the user can be received in any form, including acoustic, speech, or tactile input.

Some subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or a combination of such back end, middleware, and front end components. The components of the system can be interconnected by any form of medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the foregoing description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

The invention claimed is:

1. A computer-implemented method for notifying an entity of an incoming payment, comprising:
   receiving, by a computer system including a processor, a plurality of requests associated with a plurality of paying entities to send payment by check to a receiving entity, each request indicating an amount of the payment and an identity of the receiving entity;
   identifying, by the computer system, a mailing address associated with the receiving entity and an address for electronically contacting the receiving entity;
   identifying, by the computer system, that an option to send one or more notifications to the receiving entity identifying one or more requested payments was selected by the receiving entity;
   generating, by the computer system, the one or more notifications based on the selection of the option, each of the one or more notifications identifying an associated requested payment and including a sentence that was not included in the received plurality of requests and that conveys at least a portion of the received plurality of requests;
   causing, by the computer system, the one or more notifications to be electronically transmitted over a network to a computing device associated with the receiving entity based on the address for electronically contacting the receiving entity;
   causing, by the computer system, a plurality of checks associated with the plurality of requests to be issued and mailed to the receiving entity after the one or more notifications have been electronically transmitted; and
   in response to a selection from a user associated with the receiving entity within a notification of the one or more notifications, causing tracking information for the plurality of mailed checks to be displayed in a user interface associated with the receiving entity.

2. The method of claim 1, wherein the computer system causes the plurality of checks to be issued and mailed to the mailing address associated with the receiving entity when the receiving entity does not respond to the notification within a pre-determined period of time.

3. The method of claim 1, wherein each notification of the one or more notifications includes an inquiry as to the mailing address associated with the receiving entity, further comprising:

receiving, by the computer system, a response to a notification indicating that a different mailing address is associated with the receiving entity; and causing, by the computer system, a check to be mailed to the new mailing address.

4. The method of claim 1, further comprising generating the sentence based on a template stored in the computer system.

5. The method of claim 1, further comprising generating the sentence using natural language processing (NLP).

6. The method of claim 1, wherein the mailing address associated with the receiving entity is a first mailing address, further comprising:

receiving, by the computer system, information indicating a second mailing associated with the receiving entity in response to the user inputting the second mailing address into a screen of a user interface;

retrieving, by the computer system, a record associated with the receiving entity from a database;

identifying, by the computer system, the first mailing address from the record;

causing, by the computer system, a computing device associated with the user to prompt the user with an indication of the first mailing address; and causing, by the computer system, a check to be mailed to the first mailing address associated with the receiving entity in response to the user confirming the first mailing address as correct.

7. A computer system for notifying an entity of an incoming payment, comprising:

a memory storing instructions; and a processor that, when executing the instructions, is configured to:

receive a plurality of requests associated with a plurality of entities to send payment to a receiving entity, each request indicating an amount of the payment and an identity of the receiving entity;

cause a plurality of checks associated with the plurality of requests to be issued, each check being issued for the amount of the payment indicated in the check's associated request;

cause the plurality of checks to be mailed to a mailing address associated with the receiving entity;

cause one or more notifications to be transmitted over a network to a computing device associated with the receiving entity indicating that one or more checks have been mailed; and in response to a selection from a user associated with the receiving entity within a notification of the one or more notifications, cause tracking information for the plurality of mailed checks to be displayed in a user interface associated with the receiving entity.

8. The computer system of claim 7, wherein a notification of the one or more notifications includes a link selectable on the computing device, and the processor is further configured to:

receive an indication that the user has selected the link; and cause the computing device to generate a screen in response to user selection of the link, the screen presenting additional information about the payment.

9. The computer system of claim 7, wherein a notification of the one or more notifications includes a link selectable on the computing device, and the processor is further configured to:

receive an indication that the user has selected the link; and cause the computing device to generate a screen in response to the selection of the link indicating that the link has expired.

10. The computer system of claim 7, wherein a notification of the one or more notifications includes a link selectable on the computing device, and the processor is further configured to:

receive an indication that the user has selected the link; and cause the computing device to generate a screen in response to selection of the link, the screen providing fields that allow the receiving entity to register with an online transaction system.

11. The computer system of claim 10, wherein registration with the online transaction system allows the receiving entity to track issued checks.

12. The computer system of claim 10, wherein registration with the online transaction system allows the receiving entity to store one or more preferences regarding at least one of a mailing address, an electronic address, or whether to receive notifications.

13. The computer system of claim 7, wherein the processor is further configured to:

receive a request associated with a paying entity to send payment in response to a paying user populating one or more fields of a user interface presented on a computing device associated with the paying entity.

14. The computer system of claim 13, wherein the processor is further configured to:

automatically generate an alphanumeric string from the information representing the request to send payment from the entity to the receiving entity;

generate a notification including the alphanumeric string; and cause the alphanumeric string of the notification to be displayed by transmitting the notification over the network to the computing device associated with the receiving entity.

15. The computer system of claim 14, wherein the alphanumeric string includes alphanumeric characters identifying the entity, the receiving entity, and an amount of the payment.

16. The computer system of claim 7, wherein a notification of the one or more notifications is a first notification, and the processor is further configured to transmit a second notification to the computing device associated with the receiving entity, the second notification indicating that a check of the plurality of issued checks is going to expire.

17. A non-transitory computer readable medium storing instructions that, when executed by one or more processors, cause the one or more processors to perform a method, the method comprising:

receiving a plurality of requests associated with a plurality of paying entities to send payment to a receiving entity, each request indicating an amount of the payment and an identity of the receiving entity;

identifying a record associated with the receiving entity in response to receiving the plurality of requests;

determining that the record indicates a preference associated with the receiving entity to receive notifications;

causing one or more notifications identifying one or more associated payments to be sent to a computing device associated with the receiving entity based on the preference stored within the record; and in response to a selection from a user associated with the receiving entity within a notification of the one or more notifications, causing tracking information for a plurality of mailed checks to be displayed in a user interface associated with the receiving entity.

18. The non-transitory computer readable medium of claim 17, wherein the method further comprises causing the one or more notifications to be electronically sent over a network to a computing device associated with the receiving entity, the one or more notifications being configured to display a prompt providing the user of the computing device with an option to receive the payment via an automated clearing house (ACH) network.

19. The non-transitory computer readable medium of claim 18, wherein the method further comprises receiving bank account information for the receiving entity in response to the user selecting the option to receive the payment via the ACH network.

20. The non-transitory computer readable medium of claim 17, wherein the preference indicates a preferred frequency at which to receive notifications.

* * * * *